May 2, 1950   J. J. PANIK ET AL   2,506,277
WELDING GUN
Filed June 2, 1947   2 Sheets-Sheet 1
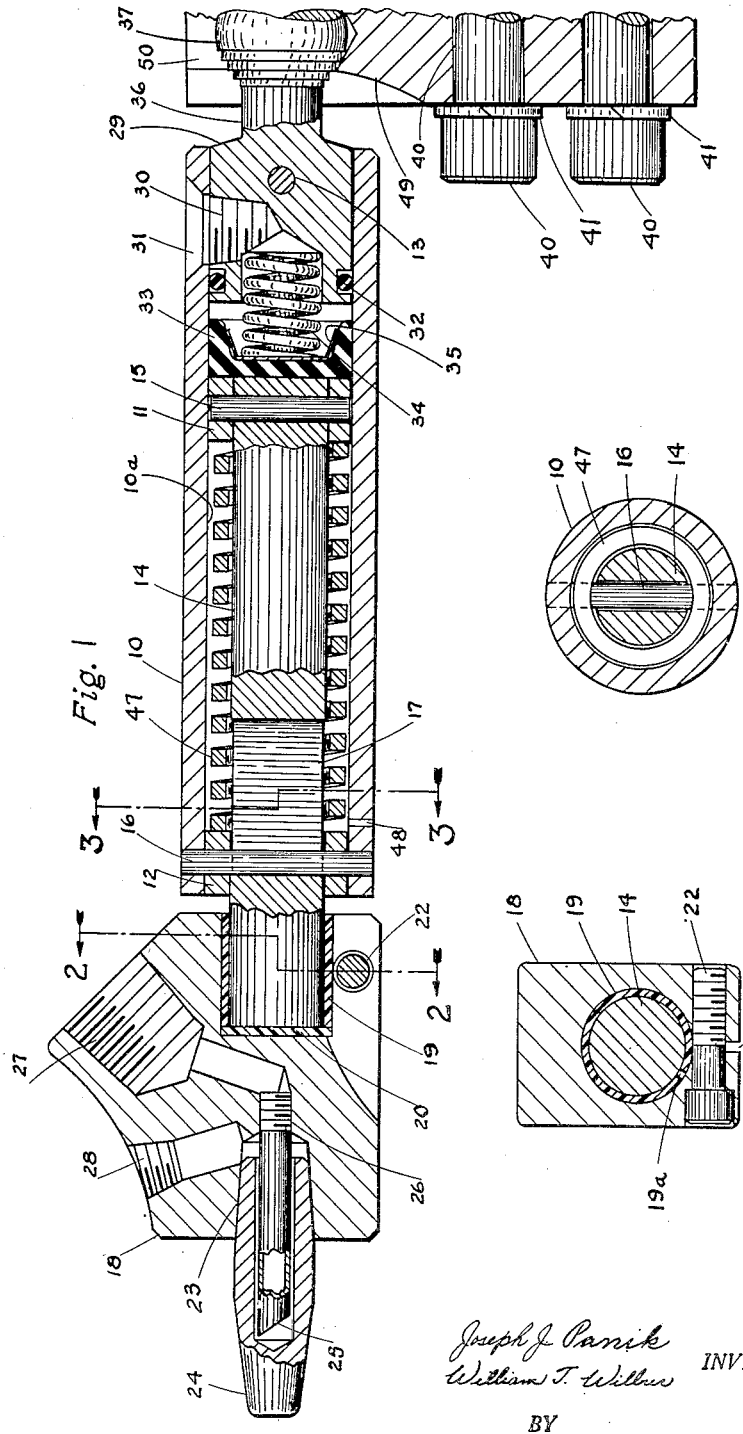
Joseph J. Panik
William T. Wilbur   INVENTORS
BY
Elmer Jamison Gray
ATTORNEY May 2, 1950 J. J. PANIK ET AL 2,506,277
WELDING GUN
Filed June 2, 1947 2 Sheets-Sheet 2
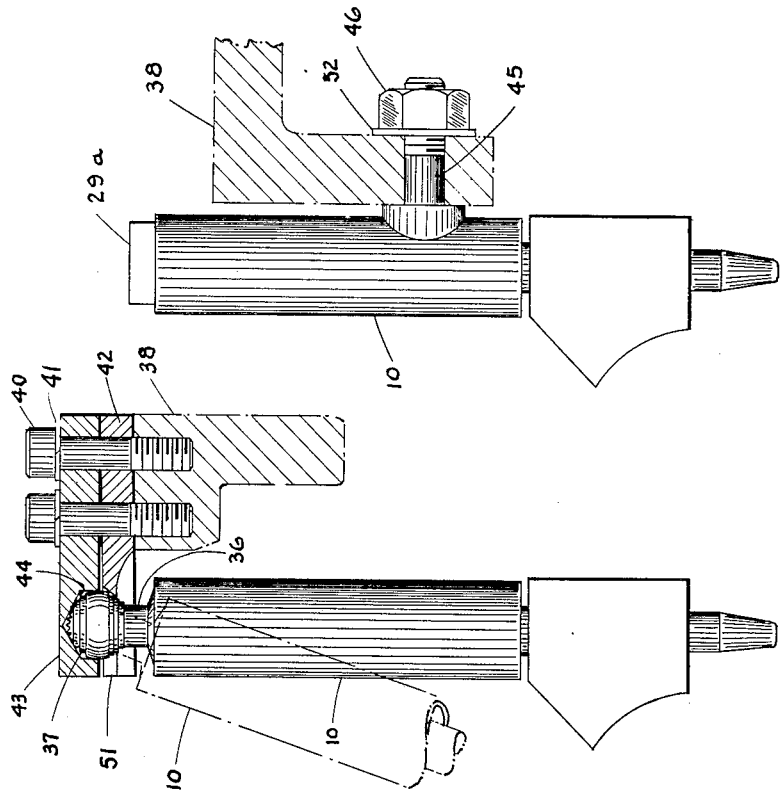
Fig. 6
Fig. 5
Fig. 4
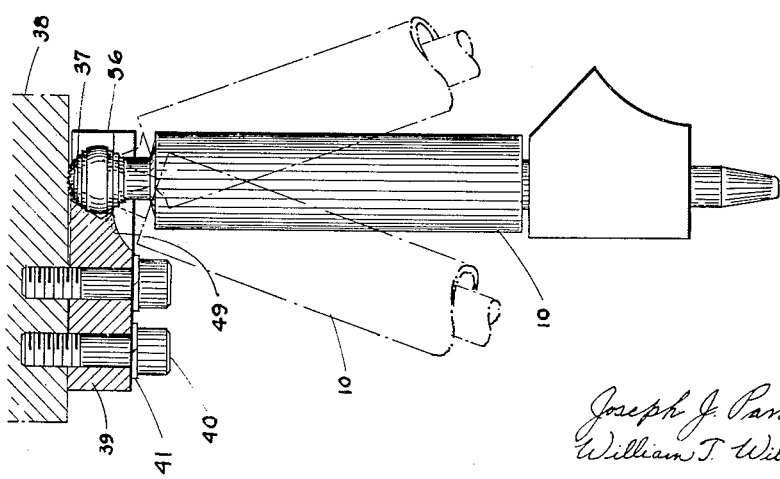
Joseph J. Panik
William T. Wilbur INVENTORS.
BY
Elmer Janssen Gray
ATTORNEY Patented May 2, 1950

2,506,277

UNITED STATES PATENT OFFICE 2,506,277

WELDING GUN

Joseph J. Panik and William T. Wilbur, Detroit, Mich., assignors to United States Engineering Co., Detroit, Mich., a firm composed of Joseph J. Panik Application June 2, 1947, Serial No. 751,750

15 Claims. (Cl. 219—4)

The present invention relates to electric welders, relating more particularly to resistance welding devices provided with movable electrodes adapted to be actuated into contact with the work and simultaneously supplied with current for effecting a welding operation.

In utilizing welders of the present type it is customary to fasten them to a support or fixture known in the art as a gun rack. Usually a group of welding units are attached to such a support and are so arranged that the individual welders or "presser electrodes" are brought into contact with the work successively or in a predetermined sequence. Normally a copper bus bar secured to a die, a jig, or the like serves as a common stationary electrode. Because of the structure of former welding machines or devices, it has been necessary heretofore to place the welding units in inconvenient places or at difficult angles and to support them in an awkward manner. Consequently, repair or replacement has been difficult, and due to the action of the cooling fluid, the large welding current, the heat, and the mechanical movement of parts of the unit, such repair and replacement is most necessary and is required far oftener than is the case for most other mechanical devices.

It is, therefore, one object of the present invention to provide improved means for mounting welding units upon a support or gun rack so that each unit may be moved freely in any direction, thus considerably assisting in adjusting the units for attaining an improved welding operation.

Another object of the invention is to provide a universal joint or ball and socket connection arranged to permit each unit to be easily removed individually for repair or replacement, which joint or connection is especially adapted to allow each unit to be moved conveniently and readily into an adjusted position and is constructed to rigidly attach the unit to the gun rack in its adjusted position.

It is another object of the invention to provide a welding unit which is adapted to be secured to its supporting fixture at one end, or at any suitable joint along the barrel, and to provide a unit that, by a simple change or rearrangement of its parts, may be used as a portable welder, or as a part of a multiple hydromatic welding machine or mechanism.

Still another object of the invention is to provide an improved split bushing and washer arrangement formed of an insulating material and interposed between the tip or a head carrying the tip, and the piston rod or other part of the device upon which the head or tip is mounted, and to provide improved clamping means cooperative with said arrangement for securing the tip or head in place while insulating it from its supporting means.

Finally, it is an object of the invention to provide a welding unit having improved structural features preventing the tip, or a head carrying the same, from rotating undesirably with respect to the barrel; and, in general, to provide a practical structure engineered for effective convenient use under the trying conditions to which welding units are necessarily subjected.

Incidentally, the improved design of the present welding unit utilizes duplicate parts and makes extensive use of standard parts, avoids threaded connections insofar as possible, thus making the unit easier to repair as well as less expensive to manufacture. Also, the barrel is cylindrical instead of hexagonal and no laterally extending arms are employed in the preferred embodiment, thus enabling the units to be placed closer together without causing short circuits or creating other hazards.

Other objects of this invention will appear in the following description and appended claims, reference being had to the accompanying drawings forming a part of this specification wherein like reference characters designate corresponding parts in the several views.

Fig. 1 is a central longitudinal section through an improved welding unit constructed in accordance with the present invention.

Figs. 2 and 3 are cross sections taken, respectively, along the lines 2—2 and 3—3 of Fig. 1 looking in the direction of the arrows.

Fig. 4 is a top plan view of the form of the invention illustrated in Fig. 1, two adjusted positions of the unit being indicated in dotted lines.

Figs. 5 and 6 are top plan views showing modifications of the present invention, the dotted lines of the former view indicating a second adjusted position of the welding unit.

In the drawings there is illustrated, by way of example, a welding gun embodying the present invention and including a body portion or barrel 10 containing a longitudinally extending chamber or bore 10a which functions as a cylinder within which a piston reciprocates. The piston includes a bushing 11 which is in sliding engagement within the longitudinal chamber 10a and is pinned to the upper end of a piston rod 14 by means of a pin 15. The piston rod 14 passes through the chamber or bore 10a and through a bushing 12 located at the lower end of the body 10. The bushing 12 is tightly fitted within the bore 10a and is held in place by means of a transversely extending pin 16. The piston rod 14 possesses a slot 17 extending across it through which the pin 16 passes. Accordingly, the piston rod 14 may reciprocate within the chamber 10a; but is prevented from rotating relative to the body 10 by the interfitting pin 16 and slot 17.

To the extending end of the piston rod 14 there is connected an electrode head 18. The head 18 is provided with a bore or recess for receiving the end of the piston rod 14 and this recess is lined with suitable insulating material. Preferably such insulating material is in the form of a split ring or bushing 19 which extends around the sides of the recess, and a flat washer 20 which covers the bottom of the recess. Accordingly, the head 18 is electrically insulated from the piston rod 14 and, therefore, from the remaining parts of the welding unit. It will be observed that the head 18 possesses a slit portion 21 (Fig. 2). A suitable fastening element, such as the bolt 22, extends transversely through the head 18 at its slit portion and serves to clamp the head upon the end of the piston rod 14. Thus, the head 18 may be rotatably adjusted on the piston rod 14 and secured in its adjusted position. Furthermore, the split bushing 19 assists in properly insulating the head 18; for its edges 19a (Fig. 2) are forced together when the bolt 22 is tightened. Nevertheless, the bushing 19 may be loosened, because of its split structure, to allow adjustment of the head 18 when the bolt 22 is loosened.

The head 18 contains a recess 23 adapted to receive a conventional tip or welding electrode 24. This welding electrode or tip 24 is hollow and is constructed and arranged to receive a fluid conducting tube 25 which, in turn, is threaded into a passage 26 within the interior of the head 18. The passage 26 leads to the threaded recess 27. A second threaded recess 28 is provided and is connected at its inner end to the recess 23. Accordingly, water or some other cooling medium may be introduced at the recess 27 and pass through the passage 26 and the tube 25 into the hollow interior of the tip 24. This cooling medium may then flow around the outer walls of the tube 25 to the end of the recess 23 finally flowing out of the recess 28 for recirculation. Suitable fluid conducting tubes or conduits (not shown) may be inserted into the recesses 27 and 28.

The upper end of the chamber 10a within the body 10 is closed by a cap or coupling member 29 which is tightly fitted within the body portion 10 and is held in place by the pin 13. The cap 29 possesses a threaded recess 30 which is registered with an aperture 31 in the side wall of the body 10. Also, the cap 29 is sealed from the cylinder portion of the bore 10a by a suitable sealing ring 32 positioned within an annular recess in the cap 29 adapted to receive it.

The reference numeral 33 designates a cup-like member formed of resilient material such as rubber. This cup-like member is arranged and dimensioned to fit snugly within the bore 10a, and is pressed against the upper end of the piston by means of a coil spring 34. The spring 34 preferably rests against a washer 35 which preferably is somewhat dish-shaped and serves to assist the spring 34 in pressing the cup 33 against the piston and also against the walls of the bore 10a. The upper end of the spring 34 is anchored within a portion of the recess 30 in the cap 29.

The reference numeral 36 designates a supporting arm which extends outwardly from the cap 29 and may be integrally formed therewith. The outer end of the arm 36 terminates in a ball 37. The ball 37 is preferably provided with a serrated or stepped surface, such as the structure best illustrated in Fig. 1. The manner in which the welding unit is secured to a support is shown, in particular, in Fig. 4. In order to so secure the welding unit to the gun rack 38, a plate 39 is provided and this plate preferably contains a cut-away portion extending through it. This cut-away portion is relatively wide at its center and is shaped and dimensioned to receive the ball 37 and to provide clamping engagement therewith when the unit is attached to its support. The cut-away portion mentioned also possesses laterally extending slot-like portions which extend in both a horizontal and a vertical plane so that the arm 36 is free to move in any direction for adjusting the position of the welding unit. One of these slot-like portions is shown at 49. Preferably the slot 49 continues at 50 to the edge of the plate 39 to provide a means for sliding the ball 37 and the welding unit into and out of the cut-away portion.

In order to firmly attach the welding unit to the support such as the gun rack 38, the plate 39 is affixed to the support by suitable fastening elements such as the bolts 40 which are threaded into the support. Preferably lock washers 41 are also employed. When the plate 39 is firmly tightened against the gun rack 38 by the bolts 40, the ball 37 is engaged and the welding unit is firmly and immovably held in place. In this connection it will be noted that in the preferred embodiment of the invention, the inner end of the ball 37 is pressed against the surface of the gun rack 38 and assists in holding the welding unit immovable. Furthermore, the serrated or stepped surface of the ball 37 provides an especially firm engagement between the ball 37 and the plate 39, as well as between the ball 37 and the gun rack 38 for holding the unit in place. In order to position the welding unit as desired, it is only necessary to loosen the bolts 40 and move the welding unit in any direction into its adjusted position and then to tighten the bolts 40 for securing the welding unit in its new position. Two such positions are indicated in dotted lines in Fig. 4, although it is apparent that the unit may be placed in any desired position.

In Fig. 5 a modified retaining means is illustrated. This retaining means is similar to the preferred embodiment fully discussed above and a supporting arm 36 terminating in a ball 37 is utilized. However, a pair of plates 42 and 43 are employed, the former having a cut-out portion 51 and the latter having a recess 44 in registry therewith. The cut-away portion 51 is generally similar to the cut-away portion 50 previously mentioned, particularly in that slotted portions are provided for permitting the arm 36 to be moved as desired. However, the ball 37 extends into the recess 44 so that the ball does not engage the gun rack 38 or other support. The fastening elements 40 serve to secure the plates 42 and 43 together and to attach them to the support or gun rack 38 in the manner clearly shown in Fig. 5. It will be understood that the welding unit may be moved to any desired position and secured therein by tightening the bolts 40 so that the plates 42 and 43 engage the ball 37 and hold the welding unit securely to its support.

Still another modification of the present invention is particularly illustrated in Fig. 6. In this modification a stud or bolt 45 is provided and is firmly attached to the outer wall of the body 10 by suitable means such as the boss shown. The stud 45 extends through a suitable aperture or hole in the gun rack or support 38 and a nut 46 which is threaded upon the stud 45 serves to hold the welding unit in place. A lock washer 52 may also be utilized. The modification of the invention shown in Fig. 6 may be converted into a portable welding unit readily and conveniently. The unit is removed from the gun rack 38 and a suitably sized and shaped jaw is fastened upon the stud 45 by the nut 46. For instance, this jaw may be C-shaped or J-shaped having a curved arm extending toward and somewhat in front of the tip 24 finally terminating in alignment therewith but spaced therefrom. Thus, a workpiece may be inserted between and contacted by the tip 24 and the jaw which act as a pair of electrodes. It will be noted that, due to the split bushing 19 and the washer 20, the tip and the arm are electrically insulated from each other. Each may be connected with a different terminal of the source of electrical current by suitable means such as a flexible conduit and a portable welder is ready for use. Of course, the welding unit may be remounted readily upon the gun rack 38 when desired to utilize it as a part of a welding machine or mechanism, such as a multiple hydromatic welder.

Once the welding unit has been adjusted and secured to its support or gun rack in the manner explained, its operation to perform a welding operation is conventional. The conductors for introducing fluid within the welding tip are also utilized to electrically connect the head 18 to a suitable source of current. Such conductors are now conventional and include an inner passageway for the cooling fluid and an outer annular electrical conducting material which surrounds the inner passage and is insulated therefrom. The welding tip 24 is actuated into contact with the workpiece by introducing hydraulic fluid under pressure through the opening 31 and passage 30. This hydraulic fluid motivates the piston, the rubber cup 33 serving as the sealing means preventing the hydraulic fluid from leaking past the piston. The stroke of the piston is determined by the length of the slot 17, the piston being in its fully retracted position when the lower end of the slot contacts the pin 16 as shown in Fig. 1, and being in its fully extended position when the upper end of the slot 17 contacts the pin 16. It will be noted that the cup 33 is maintained in engagement with the top of the piston and with the walls of the chamber 10a at all times throughout the travel of the piston by means of the coil spring 34 and washer 35. A second coil spring 47 is provided for returning the piston to its retracted position. Naturally this coil spring 47 is comparatively large and preferably extends between the bushings 11 and 12 in the manner clearly illustrated in Fig. 1. Also a comparatively small breather opening 48 extending through the wall of the body 10 is provided to facilitate operation of the piston.

Any suitable system for introducing hydraulic fluid under pressure through the opening 31 may be employed and a number of units may be operated from a single hydraulic system. Also, the electrical system for supplying current may be of any desired operable construction and numerous valves and switch systems are known for supplying hydraulic fluid to the units in a predetermined order and also supplying welding current when the proper electrode is brought into contact with the work. Any suitable arrangement of these elements may be employed depending upon the use to which the invention is put.

We claim:

1. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, and means for attaching the unit to a support, said attaching means including a universal joint as well as a fastening element associated therewith, whereby said unit may be moved in any direction relative to said support and secured in an adjusted position.

2. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, and means for attaching the unit to a support, said attaching means including a ball and socket arrangement as well as a fastening element associated therewith, whereby said unit may be moved in any direction relative to said support and secured in an adjusted position.

3. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, a ball-ended arm connected with said body, a plate having a portion adapted to receive said ball while permitting said arm to be moved in any direction, and at least one fastening element for attaching said plate to a support in engagement with said ball for securing said unit to said support in an adjusted position.

4. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, a ball-ended arm connected with said body, a plate having a portion adapted to receive said ball while permitting said arm to be moved in any direction, and at least one fastening element for attaching said plate to a support in engagement with said ball for securing said unit to said support in an adjusted position, said ball having a stepped surface for facilitating said engagement.

5. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, a fastening plate having a cut-away portion extending through it, generally horizontal and vertical slotted portions extending from said cut-away portion, a supporting arm connected with said body and terminating in a ball received within said cut-away portion and extending therebeyond, and fastening means for securing said plate to a support while clamping it against said ball with the ball pressed against the support, said slotted and cut-away portions permitting adjustment of the welding unit in any direction.

6. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, a fastening plate having a cut-away portion extending through it, generally horizontal and vertical slotted portions extending from said cut-away portion, a supporting arm connected with said body and terminating in a ball received within said cut-away portion and extending therebeyond, and fastening means for securing said plate to a support while clamping it against said ball with the ball pressed against the support, said slotted and cut-away portions permitting adjustment of the welding unit in any direction, and said ball having a stepped surface for assisting in maintaining the ball in firm engagement with the plate and support.

7. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, an inner fastening plate having a recess, an outer fastening plate having an opening registered with said recess and having generally horizontal and vertical slotted portions, a supporting arm connected with said body and terminating in a ball received within said recess and engaged by the walls of said opening, and fastening means securing said plates together in engagement with said ball and against a support, said recess and slotted portions permitting adjustment of the welding unit in any direction.

8. A fluid actuated welding unit having a body containing a cylinder, a piston reciprocable within the cylinder, a piston rod extending from the piston beyond said cylinder, an electrode mounted on said rod, means for introducing fluid under pressure into said cylinder for motivating said piston, an inner fastening plate having a recess, an outer fastening plate having an opening registered with said recess and having generally horizontal and vertical slotted portions, a supporting arm connected with said body and terminating in a ball received within said recess and engaged by the walls of said opening, and fastening means securing said plates together in engagement with said ball and against a support, said recess and slotted portions permitting adjustment of the welding unit in any direction, and said ball having a stepped surface for assisting in maintaining the ball in firm engagement with said plates.

9. A fluid actuated welding unit having a body containing a cylinder, a bushing at one end of said cylinder, a piston in said cylinder, a piston rod extending from said piston through said cylinder and bushing, fastening means securing said bushing in place and preventing said piston rod from rotating appreciably relative to said body, an electrode mounted on said rod, and means associated with said body for attaching the welding unit to a support.

10. A fluid actuated welding unit having a body containing a cylinder, a bushing at one end of said cylinder, a piston in said cylinder, a piston rod extending from said piston through said cylinder and bushing and having a slot, a pin securing said bushing in place and extending through said slot for preventing the piston rod from rotating relative to the body, an electrode mounted on said rod, and means associated with the body for attaching the welding unit to a support.

11. In a welding unit having a body containing an internal chamber within which a piston reciprocates, a slotted piston rod, a bushing at one end of said chamber through which said piston rod extends, and a transversely extending pin securing said bushing to said body and passing through said slot for preventing relative rotation between said piston and said body.

12. In a welding unit, a cylinder, a fluid actuated piston including a piston rod reciprocable within said cylinder, a bushing mounted within one end of the cylinder, and a pin extending transversely through the cylinder and bushing for anchoring the latter in place against appreciable rotation, said pin extending through a slot in the piston rod to permit reciprocation of the latter through and relatively to said bushing while preventing appreciable rotation of said piston rod.

13. In a welding unit, a cylinder, a bushing located within one end of the cylinder, a piston rod reciprocable through said bushing, and a pin extending through the cylinder and bushing and also through a slot in said piston rod to anchor the bushing in place against appreciable turning and also to permit reciprocation of the piston rod relatively to the pin.

14. In a welding unit, a cylinder, a reciprocable piston member within said cylinder, a bushing pinned to one end of the piston member and fitting within the cylinder, a second bushing fitting within the cylinder at a point spaced from the first bushing, a pin extending through the second bushing and cylinder, said piston member being reciprocable through the second bushing and having a slot to receive said pin.

15. In a welding unit, a cylinder, a fluid actuated reciprocable piston member within said cylinder, a ring embracing and pinned to said member and having a sliding fit within the cylinder, a second ring spaced from said first named ring and fitting within the cylinder, said piston member being reciprocable through said second ring, a pin extending through said cylinder and second ring and also through a slot in said piston member to permit reciprocation of the latter relatively to said second ring, and a return spring embracing said piston member and having opposite ends thereof engaging said rings.

JOSEPH J. PANIK.
WILLIAM T. WILBUR.

REFERENCES CITED

The following references are of record in the file of this patent:

UNITED STATES PATENTS

| Number | Name | Date |
| --- | --- | --- |
| 1,108,952 | Wales | Sept. 1, 1914 |
| 2,068,043 | Warnke | Jan. 19, 1937 |
| 2,089,013 | Beideman | Aug. 3, 1937 |
| 2,220,990 | Burgett | Nov. 12, 1940 |
| 2,233,897 | Nichols | Mar. 4, 1941 |
| 2,338,965 | Parsons | Jan. 11, 1944 |
| 2,342,144 | Hughes | Feb. 22, 1944 |
| 2,415,052 | Waddington | Jan. 28, 1947 |
| 2,465,456 | Johnson | Mar. 29, 1949 |